United States Patent Office 3,080,291
Patented Mar. 5, 1963

1

3,080,291
SERIAL PASSAGE OF DISTEMPER VIRUS IN TISSUE CULTURES OF CHICK EMBRYO AND CANINE TISSUE AND VACCINE THEREFROM

Shyamal K. Sinha, Mission, Kans., Vincent Marshall, Omaha, Nebr., and George M. Stewart, Jr., Kansas City, Mo., assignors to Jensen-Salsberg Laboratories, Inc., Kansas City, Mo., a corporation of Missouri No Drawing. Filed June 10, 1960, Ser. No. 35,111
4 Claims. (Cl. 167—78)

This invention relates to a method of adapting non-pathogenic strains of canine distemper virus to proliferate in tissue cultures with development of a cytopathogenic effect. Not only is the new method an important improvement in the method of producing attenuated canine distemper vaccine, but it is also useful in serological studies, virus titrations and as an aid in research on the nature of the canine distemper virus. The invention includes the vaccine when prepared by the process of the present invention as well as the new process of adapting the canine distemper virus to tissue culture methods.

Several investigators have succeeded in propagating virulent canine distemper virus, or so-called "street strains" of the virus, in dog kidney tissue growing in vitro with a resultant cytopathogenic effect. However, these virulent preparations can not be used in the preparation of live attenuated vaccines. Virulent canine distemper virus has been attenuated by serial passage in incubating chick embryos and made non-pathogenic to Canidae and a number of these chick-adapted avirulent strains of this virus are available. In recent years a number of virulent and non-virulent pathogenic viral agents have been adapted to grow in tissue cultures of one kind or another. A number of advantages are obtainable by preparing vaccines of attenuated non-virulent viruses by tissue culture methods over methods which involve growing the virus in incubating chick embryos. For example, the yield of virus in tissue culture is generally greater than that obtained in embryonating eggs and provides a more homogenous and antigenic mass which can be made into a superior vaccine. Control of the process and elimination of contaminating bacteria and foreign bodies which may result in anaphylactic or false reactions is more easily achieved. It is desirable, therefore, that a method of propagating non-virulent canine distemper virus in tissue culture be made available.

Efforts to proliferate chick embryo adapted canine distemper virus in tissue culture have been reported. While it appears that a number of serial passages of the virus have been made in tissue culture, using total chick embryo tissue, the titer was low and no cytopathic effect was observed. This latter effect is considered important, since the cytopathogenic change is an in vitro indication of virus proliferation and can be used in other ways such as indicated above. The present invention is directed to a process which enables chick embryo adapted virus to be grown in vitro in tissue of Canidae and other species with a cytopathogenic effect.

The process of the present invention is characterized by the steps of first adapting a part of the virus population of chick embryo adapted non-virulent viral preparations which may be present as mutants or genetic variants to the tisssue culture environment. This is done by first trypsinizing chick embryos and chorioallantoic membranes infected with avirulent canine distemper virus and then growing the tissues in vitro to obtain mono-layer fibroblasts. The virus released into the culture medium from the infected fibroblasts during their growth is used to inoculate cultures of suitable tissue.

More particularly the virus is adapted to grow in tissue

2 culture with cytopathic changes by the following process: Seven day embryonated eggs were inoculated on the chorioallantoic membrane with 0.1 ml. of an egg adapted attenuated canine distemper virus which had previously been passed through at least fifty-two serial passages in embryonating eggs. This was a strain of non-virulent canine distemper virus used in the commercial production of vaccine in incubating chick embryos. The strain was originally obtained from the Veterinary Virus Research Institute at Cornell University through the courtesy of Dr. James A. Baker. On the seventh day after inoculation, the eggs were harvested, and both the chorioallantoic membrane and the embryos were saved for trypsinization. Characteristic distemper virus lesions were noted on the chorioallantoic membrane on all of the inoculated embryos.

Both the chorioallantoic membrane and the embryos were minced with scissors, washed once with physiologically buffered saline and then trypsinized with 100 ml. of 0.25 percent trypsin in physiologically buffered saline, pH 7.0, fifteen to twenty minutes at 25° C., as described by Dulbecco and Vogt, Journal of Experimental Medicine, 1954, vol. 99, 167. The trypsinized cell suspension was decanted and centrifuged at 4° C. The packed cells were resuspended at a 1:100 dilution in nutrient growth medium (10 percent horse serum, 10 percent lactalbumin hydrolysate and 80 percent Earle's balanced salt solution, J. Nat. Cancer Inst. 1943, vol. 4, 165) and 20 ml. of the suspension were used to set up tissue cultures in Blake bottles. The titer of the virus at the time was $10^{-2}$ $E.I.D._{50}$/ml. when titrated in eggs.

Twenty-four to thirty-six hours after incubation at 37° C. the monolayer chick fibroblast cells completely covered the surface of the Blake bottles. Two bottles were selected on the basis of good cell growth. The growth medium was replaced with 20 ml. of maintenance medium which was two percent horse serum, 10 percent lactalbumin hydrolysate and 88 percent Earle's balanced salt solution with elimination of the phenol red. At intervals of three to five days, the media in the bottles were harvested and replaced with the same amount of new maintenance medium. In this manner the chick fibroblast monolayer cells were maintained in good condition for eighteen days. Harvested tissue culture fluid was titered in seven to eight days old chick embryonated eggs from time to time. 0.1 ml. of inoculum obtained from ten-fold dilutions of harvested fluid aliquots was inoculated on the chorioallantoic membrane (according to the technique of Dr. J. R. Gorham, Washington State Veterinary College) and the eggs were incubated for seven days at 37° C. and then examined for visible membrane lesions indicating the presence of virus.

Dog tissue cultures were prepared by establishing the growth of dog kidney tissue in monolayers in tubes. The dog kidneys obtained aseptically from 5–6 week old puppies were minced into 0.5 mm. by 0.5 mm. sizes and then trypsinized at 37° C. five to six times for five minutes at an interval of five to ten minutes. The dog kidney cells were grown with the growth medium at pH 6.8 to 7.2 consisting of ten percent bovine serum, eighty percent Earle's balanced salt solution and ten percent lactalbumin hydrolysate. The maintenance medium was two percent horse serum, ten percent lactalbumin hydrolysate and 88 percent Earle's salt solution without the phenol red. The growth and maintenance media each contained 100 I.U. of penicillin and 100 mg. of dihydrostreptomycin sulfate per ml. The pH of maintenance medium should be 7.4–7.6 for optimum virus propagation from dog kidney cells. The virus grows most satisfactorily without phenol red. pH is important in growing the virus and insuring cytopathogenic effect and should be within the range of 7.2–7.8. When the mono-layers of dog kidney tissue had become established, the cultures were inoculated with 18th day harvested supernatant liquor from the infected chick embryo fibroblasts having a titer of $10^{-3.5}$ E.I.D.$_{50}$ as described above. Two-tenth milliliter of the supernatant fluid was used to inoculate each tube which contained 0.8 ml. of maintenance medium. The tubes were then incubated at 37° C. Five dog kidney tissue cultures were established in this manner from each harvested inoculum. At intervals of two to five days the old media was replaced with fresh media and incubation continued.

After eighteen to twenty-one days of virus propagation in the dog kidney tissue tubes, a cytopathogenic effect on the infected cells was observable under the microscope. The control tubes containing the uninfected, healthy dog kidney cells remained normal. Supernatant liquid in the tubes showing a cytopathogenic effect was then harvested and titered.

Other dog kidney mono-layer tissue cultures were established in Blake bottles containing 20 ml. of maintenance fluid by inoculation with 0.5 ml. of the supernatant fluid harvested from those tubes showing a cytopathogenic effect, and the cultures were incubated as before, the medium being replaced at intervals of two to four days. When the cytopathogenic effect was again observed in the newly inoculated tissue cultures the supernatant liquor was harvested, titered and used to inoculate further dog kidney tissue cultures. After five such serial passages of the canine distemper virus in dog kidney cells, the cytopathogenic effect was observed within eight to twelve days of incubation from the time of inoculation. The titer of the harvested tissue culture virus was found to be $10^{-5.5}$ E.I.D.$_{50}$/ml. when titered in embryonated eggs. Continued serial passage of the canine distemper virus in normal dog kidney mono-layer cells resulted in further increase of titer, so that by the eighth serial passage, titers as high as $10^{-6}$ E.I.D.$_{50}$ were obtained with accompanying cytopathogenic effects within seven to twelve days. Tissue culture fluid having a titer of $10^{-5}$ E.I.D.$_{50}$/ml. is satisfactory for preparing vaccine.

The identity of the canine distemper virus propagating in the tissue cultures was established by serum neutralization tests in which the virus was neutralized by specific canine distemper anti-serum. Also, the tissue culture virus was found to grow well in incubating eggs and caused characteristic lesions on the chorioallantoic membrane.

A vaccine was prepared from the tissue culture fluid and the virus was inoculated into ferrets and dogs who showed no reaction but developed an immunity specific for canine distemper. When challenged with a virulent canine distemper virus of the Snyder Hill strain, all of the animals survived.

Although the process of the present invention has been described while using dog kidney tissue, tissue of other parts of the animal may be used. For example, primary and stable cells from kidney, amnion, lungs, liver and spleen of Canidae, Simidae, Felidae, avian, bovine, porcine and equine species may be used in lieu thereof.

As will be understood by those skilled in the art, the vaccine may comprise nothing more than the harvested tissue culture fluid, and vaccination of animals susceptible to canine distemper virus is accomplished in the usual manner by intramuscular injection of a small quantity of the fluid. 10 E.I.D.$_{50}$ (egg infections doses—50 percent end point) will immunize dogs against canine distemper. If desired, the fluid may be cleared of cell debris, quick-frozen and dried under vacuum by the conventional lyophilization process and the dried preparation can be stored until ready for use. The vaccine is prepared by simply reconstituting the lyophilized material with water or isotonic saline to original volume.

We claim:

1. A method of preparing canine distemper virus vaccine which comprises preparing tissue cultures of trypsinized chick embryo tissue, infected with non-pathogenic canine distemper virus which has been adapted to grow in chick embryos, incubating the inoculated chick embryo tissue cultures with replacement of the culture medium at 3 to 5 day intervals while the canine distemper virus is proliferated in said chick embryo tissue and liberated into the culture fluid, harvesting a portion of the said culture fluid containing viable canine distemper virus and inoculating tissue cultures of canine tissue cells therewith and incubating said inoculated tissue cultures with replacement of fluid culture media at 2 to 5 day intervals until a cytopathogenic effect is observed in said canine tissue cells and thereafter removing the tissue culture fluid from said cultures and preparing a canine distemper vaccine therefrom.

2. A method of preparing canine distemper virus vaccine which comprises the steps of trypsinizing chick embryo tissue infected with a non-pathogenic strain of canine distemper virus adapted to grow in chick embryo tissue, growing the infected chick embryo cells in tissue culture while replacing the culture media at 3 to 5 day intervals until the virus has proliferated and a part thereof has passed into the culture fluid, harvesting a portion of the culture fluid and inoculating tissue cultures of dog kidney cells with the canine distemper virus and incubating the said inoculated tissue cultures with replacement of the culture media at 2 to 5 day intervals until a cytopathogenic effect is observed, inoculating other dog kidney cell tissue cultures with part of the culture fluid from the cultures in which a cytopathogenic effect has been developed and continuing the serial passage of the canine distemper virus from one dog tissue culture to another until the titer of the virus has reached $10^{-5}$ E.I.D.$_{50}$/ml. and withdrawing the culture fluid and preparing a canine distemper virus vaccine therefrom.

3. A method of preparing canine distemper virus vaccine which comprises the steps of establishing a monolayer chick fibroblast cell tissue culture and inoculating the culture with a strain of non-pathogenic canine distemper virus which has been adapted to grow in chick embryos, incubating the inoculated chick embryo tissue cultures at approximately 37° C. and replacing the culture media with new media at intervals of 3 to 5 days, and, after a period of incubation under such conditions during which the canine distemper virus propagates in the chick embryo tissue and is liberated into the culture fluid, harvesting a portion of the said culture fluid containing viable canine distemper virus and inoculating dog tissue cultures with said chick embryo tissue culture fluid, incubating the dog tissue cultures at about 37° C. and at a pH within the range 7.2 to 7.8, replacing the culture fluid of said dog tissue cultures at intervals of about 2 to 5 days and continuing the incubation until a cytopathogenic effect is observed on said dog tissue cells, removing a portion of the tissue culture fluid from said dog tissue cultures and inoculating other established dog tissue cultures with said fluid, incubating the second dog tissue cultures at about 37° C. and at a pH within the range of 7.2 to 7.8 with replacement of the tissue culture fluid at intervals of 2 to 5 days and continuing the incubation until a cytopathogenic effect is observed on the second tissue culture dog cells, and continuing the process of inoculation of dog tissue cell cultures and incubation until the culture fluid is of desired titer, and preparing a vaccine from the fluid of said culture.

4. A canine distemper vaccine effective in immunizing canines against distemper which comprises tissue culture fluid, from cultures in which canine tissue has grown, containing viable, non-pathogenic canine distemper virus which is cytopathogenic to chick embryo tissue and canine tissue in tissue culture, said vaccine being prepared by the process of claim 1.

References Cited in the file of this patent

Cox: Annals of the New York Academy of Sciences, vol. 55, art. 2, pp. 236–247, 1952.

Rockburn: Archiv Virusforschung, 1958, pp. 485–492.

Vantsis: The Veterinary Record, Jan. 31, 1959, pp. 99–100.

Cabasso et al.: Proc. Soc. Exp. Biol. Med., March 1959, pp. 551–554.

Sinha et al.: Vet. Med., April 1960, pp. 36–40.

Prier: J. of American Veterinary Med. Assoc., Nov. 15, 1960, pp. 577–584.